(No Model.) 2 Sheets—Sheet 1.
J. A. MONTGOMERY.
MACHINE FOR SAWING THE MOUTHS OF MOLDING PLANES.
No. 431,382. Patented July 1, 1890.
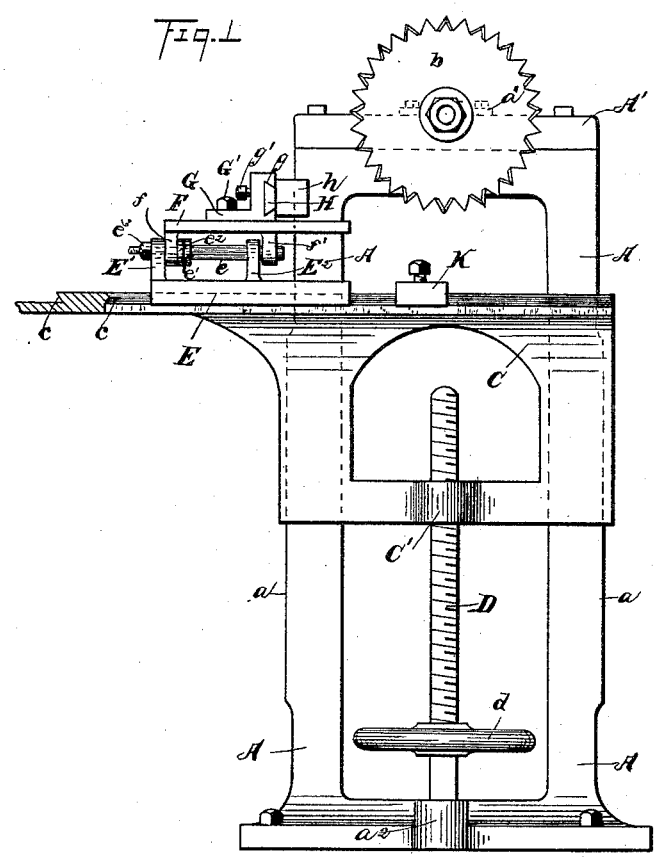
Fig. 1
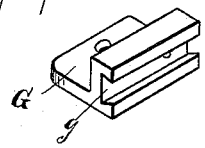
Fig. 3
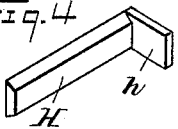
Fig. 4
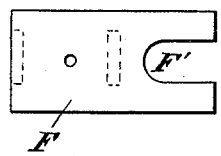
Fig. 5
Fig. 6
Witnesses.
Belle S. Louris
C. H. Wor[?]
Inventor.
Joseph A. Montgomery
Leggett and Leggett
Attorneys.
THE NORRIS PETERS CO., PHOTO-LITHO., WASHINGTON, D. C.

(No Model.) 2 Sheets—Sheet 2.
J. A. MONTGOMERY.
MACHINE FOR SAWING THE MOUTHS OF MOLDING PLANES.
No. 431,382. Patented July 1, 1890.
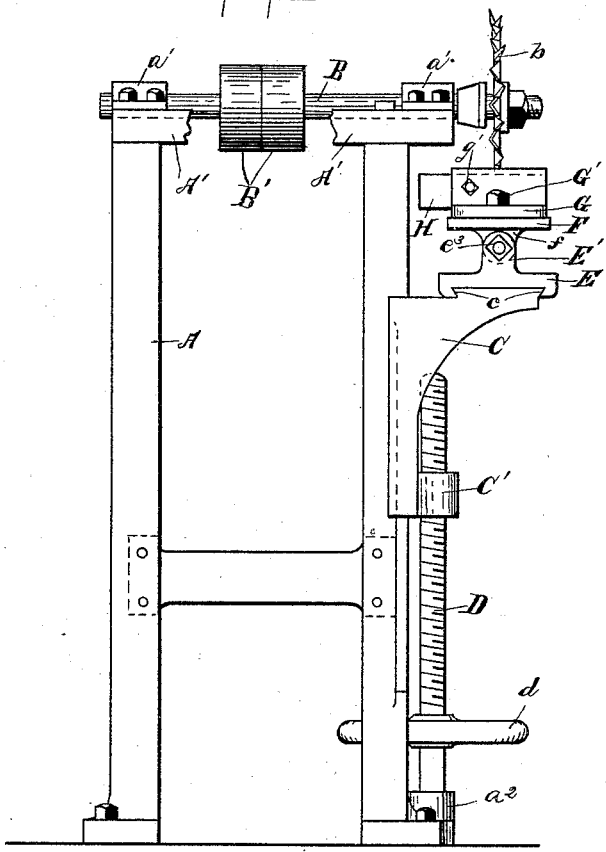
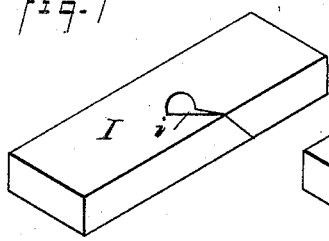
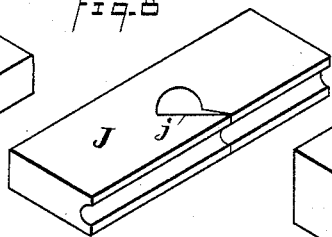
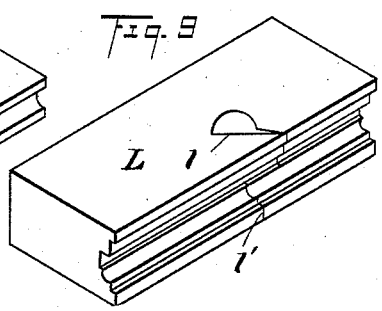
Witnesses.
Belle S. Lowrie.
Inventor.
Joseph A. Montgomery
Leggett & Leggett.
Attorneys.

UNITED STATES PATENT OFFICE.

JOSEPH A. MONTGOMERY, OF SANDUSKY, OHIO, ASSIGNOR TO THE SANDUSKY TOOL COMPANY, OF SAME PLACE.

MACHINE FOR SAWING THE MOUTHS OF MOLDING-PLANES.

SPECIFICATION forming part of Letters Patent No. 431,382, dated July 1, 1890.

Application filed February 15, 1890. Serial No. 340,542. (No model.)

*To all whom it may concern:*

Be it known that I, JOSEPH A. MONTGOMERY, of Sandusky, in the county of Erie and State of Ohio, have invented certain new and useful Improvements in Machines for Sawing the Mouths of Molding-Planes; and I do hereby declare the following to be a full, clear, and exact description of the invention, such as will enable others skilled in the art to which it pertains to make and use the same.

My invention relates to improvements in machines for sawing the mouths of molding-planes, &c.; and it consists in certain features of construction and in combination of parts hereinafter described, and pointed out in the claims.

There are a great variety of molding-planes and rabbet-planes, &c., in which the respective plane-irons are set at various inclinations and at various angles transversely, some of the plane-irons extending across the face of the plane and others extending only part way across, and some planes have two plane-irons, one on each side thereof. The so-called "mouth" or "slot," wherein the plane-iron is set, is usually cut by means of a small circular saw on an ordinary saw-table, and heretofore a pattern was made for each variety of plane, a pattern comprising a block of wood, the top surface thereof being adapted to receive and fit the plane and the bottom surface being adapted to rest and slide on the saw-table, the block or pattern being of such angular or wedge-shaped form lengthwise and crosswise, and having a beveled end for engaging the guide of the saw-table, that the plane was made to engage the saw at the desired angle. These patterns had to be made with great care and accuracy, and each workman was supposed to provide his own patterns, so that a plane-factory was likely to be cumbered with absolutely cart-loads of these patterns. The patterns of different workmen would likely vary more or less, so that the work in the aggregate was not uniform and the patterns were likely to warp and wear, and in one way and another much difficulty was encountered. I have therefore devised a machine for doing such work, the same being illustrated in the accompanying drawings.

Figure 1 is a side elevation. Fig. 2 is a front elevation. Figs. 3 and 4 are views in perspective of angle-plate or guide-block and gage detached. Fig. 5 is a plan of the tilting-table detached. Fig. 6 is an end elevation of a stop, hereinafter described. Figs. 7, 8, and 9 are views in perspective of planes illustrating the work done on this machine.

A represents a supporting frame or standard, if preferred, on top of which is secured a horizontal frame A', the latter having boxes $a'$, in which is journaled the saw-mandrel B, the arrangement being such that the saw $b$ overhangs the supporting-frame some little distance. The saw-mandrel is provided with driving and loose pulleys, as shown at B'. These frames may be varied indefinitely, according to the judgment of the builder, and they may be made of wood or metal, as preferred. The frames A A' (shown in the drawings) are supposed to be of metal and may be cast integral, if preferred. Frame A is provided with vertical ways $a$, on which the primary table C reciprocates vertically. Frame A has a laterally-projecting boss $a^2$, that serves as a stepping for the upright screw D. This screw engages nut C' of the primary table C, the screw being provided with handwheel $d$ for operating the same, whereby table C is raised or lowered. Table C is provided with horizontal longitudinal ways $c\ c$, on which is mounted slide E, the latter being reciprocated on these ways by hand in the direction toward and from the saw. Slide E is provided with upwardly-projecting arms E' E², to which arms are pivotally attached the depending arms $f\ f'$ of tilting table F, the axial rod $e$ having an easy fit in the holes of these two sets of arms, so that the table F may tilt laterally. Rod $e$ is provided with a shoulder at $e'$ for engaging collar $e^2$, the latter being mounted loosely on the rod, and the reduced section of the rod that extends through the holes of arms E' and $f$ is provided outside arm E' with nuts $e^3$. With such construction the parts are easily assembled, and by tightening nut $e^3$ arms E' and $f$ are clamped together, whereby the tilting table may be held rigidly in its adjusted position, arms E² and $f'$ meantime being slightly separated. Table F has a slot F' at the end thereof that is next the saw, the slot being broad enough to admit the saw when the table shall have been tilted to any angle that is required for doing such work, and this slot being long enough to allow the saw to cut into the plane the desired distance.

On top of table F is mounted an angle-plate G, extending crosswise the table, this angle-plate being pivotally secured to the table by means of bolt or stud G', so that it may be swung around to different positions. The upright face of the angle-plate that serves as a rest or a guide for the work is provided with a longitudinal recess $g$, the same having undercut walls, and in this recess is fitted the body of gage H. This gage is bent at right angles, so that member $h$ thereof is in position for engaging the end of the plane, the gage being held in adjustment by means of set-screw $g'$.

I, J, and L represent three varieties of planes that may serve to illustrate the work done on this machine, these planes having, respectively, throats $i, j$, and $l$. These planes are laid flatwise on the tilting table F, with the face of the plane of course presenting toward the saw and the one end of the plane bearing against member $h$ of the gage, and the back of the plane bearing against the face of plate G. If the throat is to be cut through and through the plane, as shown in Figs. 7 and 8, the tables, by means of screw D, are adjusted vertically to bring the work about opposite the center of the saw. If, as in case of plane J, Fig. 8, the throat $j$ is to be cut square across the face of the plane, table F is adjusted to and secured in a horizontal position and plate G is adjusted and secured at the proper angle relative to table F. Next, gage H is adjusted to gage the mouth lengthwise the plane, after which the plane is forced by hand against the saw, and any number of planes of this variety may be operated upon in quick succession and the mouths cut therein with perfect uniformity.

In case of plane I, Fig. 7, as the mouth $i$ thereof extends obliquely across the face of the plane, in addition to the adjustment of parts already mentioned table F is tilted to the one side, so that the face thereof corresponds with the angle of the mouth of the plane crosswise the face of the plane. In case of plane L, Fig. 9, having two throats $l\ l'$, each of which only extends part way through the plane, in addition to the adjustment aforesaid the table is lowered so that a portion of the plane can pass under the saw, the saw cutting a mouth of the required depth, and when mouths $l$ of the batch of planes have been cut the machine is readjusted for cutting mouths $l'$, and of course the plane is reversed.

A stop of some kind is provided to limit the movement of slide E toward the saw—for instance, stop K.

In plane factories the different varieties of planes are made up in large batches, usually enough to supply the trade for, say, a year. The one plane of a batch is laid out by means of a bevel square or pattern to indicate the location, inclination, and angle of the mouth, and from this plane the machine is set in a few moments time.

I have reduced the machine to practice and its operations are entirely satisfactory, and by means thereof is effected a very great saving over the old methods of doing this kind of work.

What I claim is—

1. The combination, with a supporting-frame and saw, of a primary table mounted on such frame, a screw connecting with the frame and with the table for actuating the latter vertically, a slide mounted on the table and having an end movement toward and from the saw, a laterally-tilting table mounted on the slide, and a rest mounted on and pivotally connected with the tilting table, substantially as set forth.

2. The combination, with a supporting-frame and a saw overhanging the frame, of a vertically-adjustable table mounted on such frame, the slide mounted on the table, a laterally-tilting table mounted on the slide, a rest mounted on and pivotally connected with the tilting table, and a gage operatively connected with such rest, substantially as set forth.

In testimony whereof I sign this specification, in the presence of two witnesses, this 30th day of January, 1890.

JOSEPH A. MONTGOMERY.

Witnesses:
C. H. DORER,
GEO. W. KING.